(12) United States Patent
Mill

(10) Patent No.: US 9,833,367 B2
(45) Date of Patent: Dec. 5, 2017

(54) MODULAR ELEMENT FOR A VEHICLE

(71) Applicant: FRANZ KIEL GMBH, Noerdlingen (DE)

(72) Inventor: Jürgen Mill, Ellwangen (DE)

(*) Notice: Subject to any disclaimer, the term of this patent is extended or adjusted under 35 U.S.C. 154(b) by 71 days.

(21) Appl. No.: 14/838,648

(22) Filed: Aug. 28, 2015

(65) Prior Publication Data
US 2017/0128289 A1    May 11, 2017

(51) Int. Cl.
*A61G 3/08*   (2006.01)
*B60N 2/24*   (2006.01)

(52) U.S. Cl.
CPC ........... *A61G 3/0808* (2013.01); *B60N 2/242* (2013.01); *B60N 2/245* (2013.01)

(58) Field of Classification Search
CPC .......... A61G 3/08; A61G 3/0808; B60N 2/02; B60N 2/242; B60N 2/245; B60P 7/08; B60P 7/0823
USPC ......... 296/65.03, 65.04, 68.01; 410/7, 8, 10, 410/11, 23
See application file for complete search history.

(56) References Cited

U.S. PATENT DOCUMENTS

| 6,113,325 | A  | * | 9/2000  | Craft      | A61G 3/0808 |
|           |    |   |         |            | 296/65.04   |
| 6,524,039 | B1 | * | 2/2003  | Magnuson   | A61G 3/0808 |
|           |    |   |         |            | 410/100     |
| 7,717,655 | B2 | * | 5/2010  | Cardona    | A61G 3/0808 |
|           |    |   |         |            | 410/23      |
| 8,911,188 | B1 |   | 12/2014 | Mill       |             |
| 2009/0087278 | A1 | * | 4/2009 | Girardin   | B60R 22/20  |
|           |    |   |         |            | 410/3       |
| 2015/0328067 | A1 | * | 11/2015 | Girardin  | A61G 3/0808 |
|           |    |   |         |            | 410/7       |
| 2016/0016498 | A1 | * | 1/2016 | Hammarskjold | A61G 3/0808 |
|           |    |   |         |            | 410/7       |

FOREIGN PATENT DOCUMENTS

DE    202015105429 U1 * 1/2017 ........... A61G 3/0808

OTHER PUBLICATIONS

English translation of DE 20 2015 105 429; retreived May 2, 2017 via PatentTranslate located at www.epo.org.*

* cited by examiner

*Primary Examiner* — Jason S Daniels
(74) *Attorney, Agent, or Firm* — Ryan M. Fountain

(57) ABSTRACT

A module element for a vehicle, in particular a public transport vehicle such as a bus or train, comprises a lower component and an upper component connected to the lower component at an interface. The essentially identical lower component can be combined with different upper components.

13 Claims, 2 Drawing Sheets

MODULAR ELEMENT FOR A VEHICLE

BACKGROUND OF THE INVENTION

The invention concerns a modular element for a vehicle, in particular a public transport vehicle such as a bus or train, with a lower component and with an upper component connected to the lower component at an interface.

U.S. Pat. No. 8,911,188 B1 describes a double folding seat for a vehicle having a bench seat position in the direction of travel of the vehicle and a retaining device for holding a wheelchair. The holding device has a clamping means that locks the wheelchair to the seat in a case in which the seat is not occupied, and a loosening means that releases the clamping means. The clamping means as well as the loosening means are fixed to a wall which also holds the bench seat of the double folding seat.

Instead of such double folding seats, space partitioning elements are often used alone, in order to provide more space for the wheelchair driver. In such a case, for the space partitioning element a structure which is independent of the double folding seat must be produced, which entails very great complexity and the corresponding costs.

It is therefore the purpose of the present invention to provide a modular element for a vehicle, in particular a public transport vehicle, which entails little structural complexity.

SUMMARY OF THE INVENTION

According to the present invention this is achieved by a modular element for a vehicle, in particular a public transport vehicle such as a bus or train, which comprises a lower component and an upper component connected to the lower component at an interface, such that the essentially identical lower component can be combined with different upper components.

Thus, according to the invention a lower component, identical in principle, is connected to an upper component appropriate for the requirements concerned, so that for the lower component only one single structure is needed, which can be kept in place for all the various upper components. This on the one hand reduces the structural complexity and on the other hand makes it possible to fix only the lower component to the vehicle's structure and attach the appropriate upper component to the lower component as necessary. Needless to say, the upper component can also be fixed to the vehicle's structure.

Thus, compared with known designs the system according to the invention provides a more simple and less expensive solution. The requirements to be met by the upper component, as appropriate for each case, are usually defined by the needs determined by the operator of the vehicle.

For example, to attach a wheelchair to the modular element it can be provided that the lower component comprises a holding device for holding a wheelchair. By accommodating the holding device within the lower component a wheelchair can be fixed to the modular element according to the invention regardless of which upper component the lower component is combined with.

The wheelchair can be attached very simply if the holding device comprises at least two hooks, which can be tightened by means of respective clamping devices and released by means of respective release devices.

In this case the release device and/or the clamping device can be arranged in the upper component. This enables very simple operation when fixing and/or releasing the wheelchair onto or from the modular element.

In order to be able to carry as many passengers as possible in the vehicle, it can further be provided that the upper component is in the form of a double folding seat with a bench seat facing the travel direction of the vehicle, which has a backrest and a seat surface that can swivel between a rest position and a sitting position.

Alternatively, it can be provided that the upper component is in the form of a barrier. In that case there is more free space in front of the modular element for the wheelchair. Besides, such a barrier is a less expensive solution than a double folding seat.

A very simple design of the barrier is one in which the barrier comprises a frame element and a partition element held within the frame element.

In order to provide a person standing in the vehicle with the possibility of holding on to the barrier, it can in addition be provided that the partition element has a cut-out that enables gripping of the frame element from any direction.

If a safety belt is fixed on the upper component, the person using the wheelchair can be held reliably on the modular element, so that the risk of injury is greatly reduced and safety is increased.

A simple way to connect the lower component to the upper component is to connect the two of them by means of screws.

Then, depending on the upper component in use a different number of screws can be used. In such a case the lower component can be adapted to the upper component to a very slight extent in that, for example, certain screws holes are only provided when corresponding screws are needed for fixing the upper component onto the lower component. Of course, however, it is also possible to provide in the lower component all the screw holes that could be needed for all of the different upper components.

The upper component is connected to the lower component more securely if the screws extend vertically.

Below, the principle of an embodiment of the invention is described with reference to the drawings.

DESCRIPTION OF THE EXAMPLE EMBODIMENT

Figure 1:
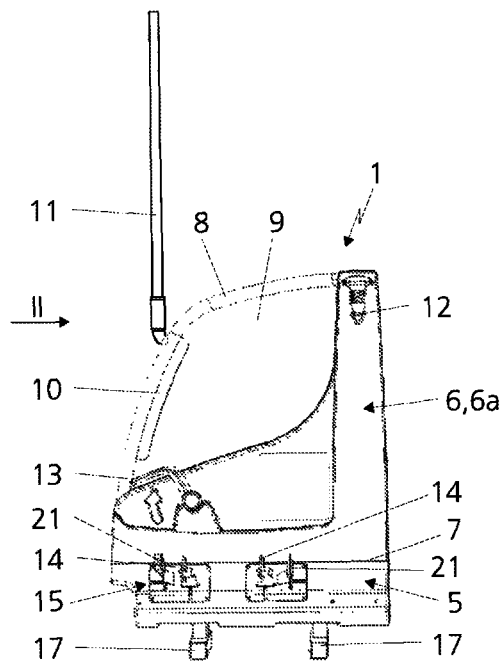
FIG. 1: A first embodiment of the modular element according to the invention.
Figure 5:
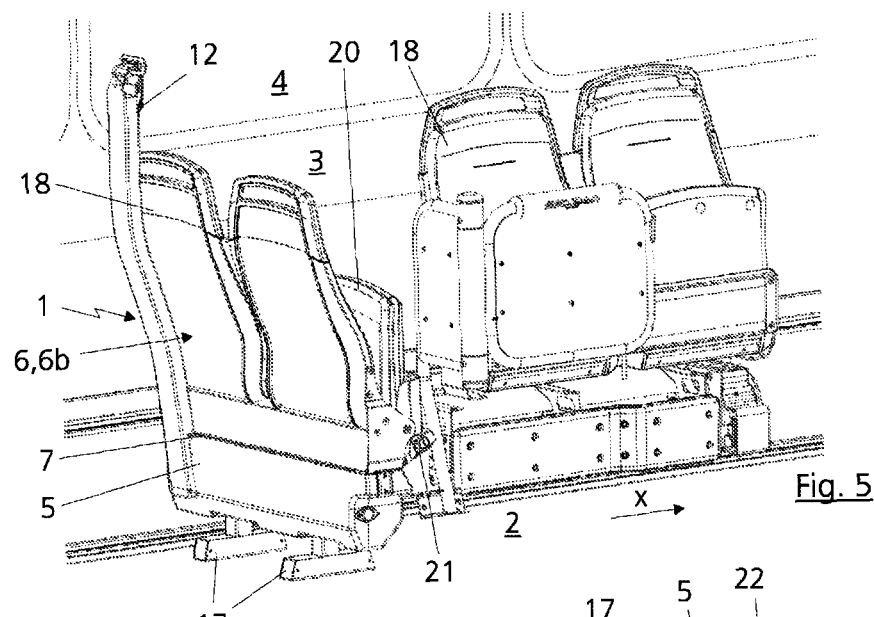
FIG. 5: A further view of the modular element of FIG. 3.

FIG. 1 shows a modular element 1 for a vehicle (not shown), in particular a public transport vehicle such as a bus or train. FIG. 5 shows a floor 2, a sidewall 3 and a window 4 of the vehicle.

The modular element 1 has a lower component 5 and an upper component 6, which are connected to one another at an interface 7. As described in more detail herein, the lower component 5 of the modular element 1 is always one and the same lower component 5, while in contrast different upper components 6 can be combined with the identical lower component 5.

Figure 2:
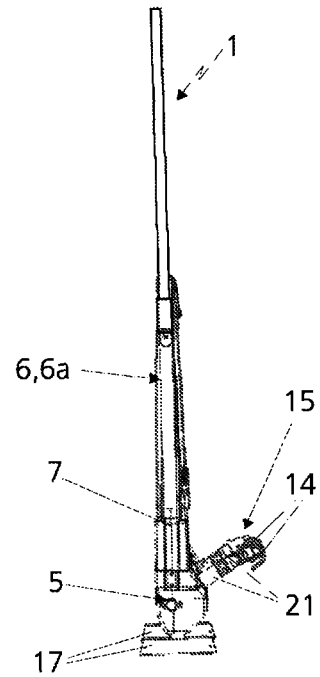
FIG. 2: A side view of the modular element, seen along the arrow II in FIG. 1.

In the embodiment of the modular element 1 shown in FIGS. 1 and 2 the upper component 6 is in the form of a barrier 6a and comprises a frame element 8 and a partition element 9 held in the frame 8. The partition element 9 is preferably transparent and can for example consist of a transparent plastic such as Plexiglas. Moreover, it can be seen in FIG. 1 that the partition element 9 has a cut-out 10 in the area of the frame element 8 or adjacent thereto, which allows the frame element 8 to be gripped so that passengers in the vehicle can hold firmly onto the barrier 6a.

in the present case a holding element 11 is fixed onto the frame element 8, which extends in the vertical direction and serves to connect the frame element 8 and thus also the upper component 6 of the modular element 1 to a roof (not shown) of the vehicle. This ensures a more secure attachment of the modular element 1 as a whole to the vehicle. Of course, the upper component 6 can additionally or alternatively also be attached to the sidewall 3 of the vehicle in a lateral area. Furthermore, in the present case a safety belt 12 is arranged on the upper component 6, whose function will be described in more detail later. In the present case the upper component 6 also has a clamping device 13. The clamping device serves to clamp one or more hooks 14 of a holding device 15 which is associated with the lower component 5, which serves in turn for holding a wheelchair 16 shown in FIG. 4. The holding device 15 will now be described in more detail with reference to FIGS. 3 and 4.

The lower component 5 also has two supporting feet 17 by which the modular element 1 is supported on the floor 2 of the vehicle. On its supporting feet 17 the lower component 5 can be screwed to the floor 2.

Figure 3:
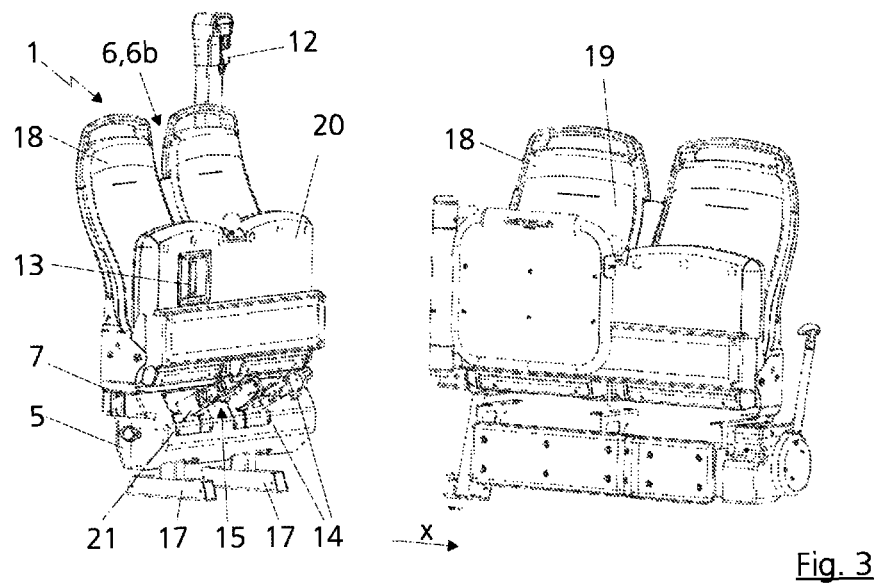
FIG. 3: A second embodiment of the modular element according to the invention.
Figure 4:
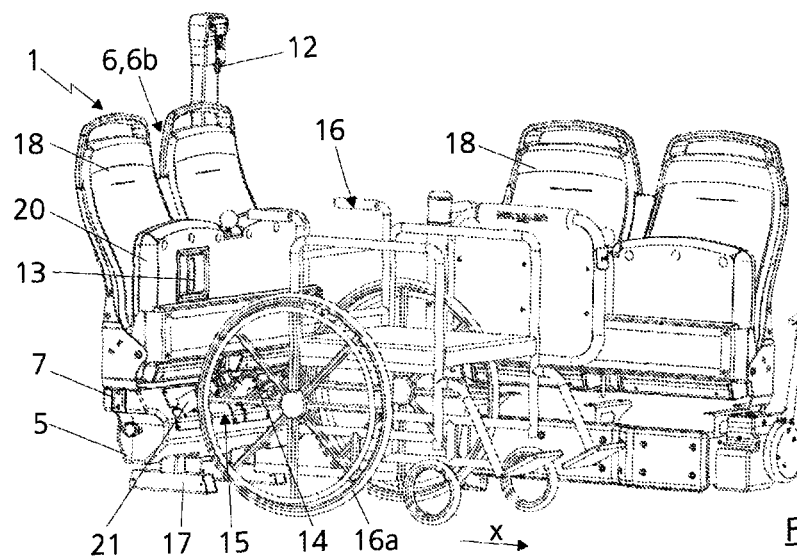
FIG. 4: The modular element of FIG. 3 in another configuration.

In the embodiment of the modular element 1 shown in FIGS. 3, 4 and 5 the upper component 6 is in the form of a double folding seat 6b with a bench seat 18 in the travel direction x of the vehicle, which bench seat has a backrest 19 and a sitting surface 20 that can be swiveled between a rest position and a sitting position. By using the double folding seat 6b as the upper component, additional seating places are provided. For this, however, slightly more space is also needed than when the barrier 6a is used as the upper component 6.

When the sitting surface 20 of FIGS. 3, 4 and 5 is swiveled up into a rest position, it can be swiveled down (in a manner not shown) to a sitting position on which a passenger (not shown) can sit. In the rest position of the bench seat 18 and therefore of the modular element 1, the wheelchair 16 can be attached onto the modular element 1. To do this the hooks 14 of the holding device 15 are hooked onto a wheel 16a of the wheelchair 16 and clamped by means of the clamping device 13 also shown in FIGS. 3 and 4, although this is equipped with a slightly different actuating element. By virtue of this clamping means of the hooks 14 and holding device 15 the wheelchair can be held fast on the modular element 1. This is possible regardless of whether the modular element 1 has the upper component 6 in the form of a barrier 6a or the upper component 6 in the form of a double folding seat 6b. In addition a release device (not shown in the figures) is provided, by means of which the hooks 14 can be released and the wheelchair 16 accordingly moved. The clamping device 13 and the release device (not shown) can be designed to operate both mechanically and electrically.

FIG. 5 shows a further view of the modular element 1 in the configuration of FIG. 3. In this case, as also in FIGS. 3 and 4, there can be seen a further bench seat 18 arranged in front of the bench seat in the travel direction x, again in the form of a double folding seat, which can likewise be made as part of the modular element 1 and can have its lower component 5. However, that bench seat is arranged perpendicularly to the travel direction x.

Figure 6:
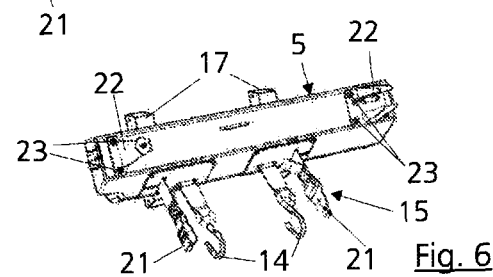
FIG. 6: The lower component of the modular element according to the invention.

FIG. 6 shows the lower component 5 of the modular element 1, which is indeed made identically in both embodiments of the modular element 1 as described above, without the associated upper component 6. Here, it can be seen that besides the two hooks 14 of the holding device 15 the lower component 5 also has two safety-belt elements 21, which can be connected to one another and with which a passenger (not shown) in the wheelchair 16 can be secured. The safety belt 12, which is in the form of a diagonal belt, can also serve to secure the passenger in the wheelchair 16 and is also present in the embodiment according to FIGS. 3 to 5.

Besides the connecting elements 22 that in FIG. 6 extend toward the upper component 6, The lower component 5 has a number of screws 23 by which the lower component 5 is connected to the upper component 6. Preferably the screws 23 extend vertically. Depending on the upper component used, it is preferable to use different numbers of screws in order to ensure optimum fastening of the upper component 6 onto the lower component 5 even with differing embodiments.

The invention claimed is:

1. A module element for a vehicle, in particular a public transport vehicle such as a bus or train, the module element comprising:
    a lower component, and
    an upper component interchangeably connected within the vehicle to the lower component at an interface such that the lower component can be combined with different types of upper components.

2. The module element according to claim 1, wherein the lower component comprises a holding device for holding a wheelchair.

3. The module element according to claim 2, wherein the holding device has at least two hooks that are clamped by respective clamping devices and released by respective release devices.

4. The module element according to claim 3, wherein at least one of the release device and the clamping device is arranged in the upper component.

5. The module element according to claim 1, wherein the upper component is a double folding seat with a bench seat in a travel direction of the vehicle, which comprises a backrest and a sitting surface that is pivotable between a rest position and a sitting position.

6. The module element according to claim 1, wherein the upper component is a barrier.

7. The module element according to claim 6, wherein the barrier comprises a frame element and a partition element that is fixed within the frame element.

8. The module element according to claim 7, wherein the partition element has a cut-out to allow gripping of the frame element.

9. The module element according to claim 1, wherein a safety belt is attached on the upper component.

10. The module element according to claim 1, wherein the lower component includes a configuration for accommodating alternative fastener arrangements, such as a different number of screws, according to which type of upper component is in use at a given time.

11. The module element according to claim 10, wherein the screws extend vertically.

12. A module element for a public transport vehicle in order to allow changeable, alternative passenger accommodations, the module element comprising:
- a lower component which is kept in place once attached to the vehicle, and
- a plurality of different types of upper components that are alternatively, removably connected to the lower component at an interface such that the lower is combinable with different upper components interchangeably within the vehicle.

13. The module element according to claim 12, wherein the plurality of different types of upper components includes at least a barrier configuration and a multi-person folding seat, as alternative components for connection with the lower component, and
- the lower component includes a device for releasably retaining a wheelchair thereto, regardless of which types of upper component is interchangeably attached thereto within the vehicle.

* * * * *